United States Patent
Prall (10) Patent No.: US 7,865,785 B2
(45) Date of Patent: Jan. 4, 2011

(54) SYSTEM AND METHOD FOR IMPROVING COMMUNICATIONS FOR SYSTEMS HAVING COMMUNICATIONS PROTOCOL ENABLED DEVICES

(75) Inventor: John Michael Prall, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 469 days.

(21) Appl. No.: 12/030,358

(22) Filed: Feb. 13, 2008

(65) Prior Publication Data

US 2009/0204728 A1    Aug. 13, 2009

(51) Int. Cl.
G06F 11/00 (2006.01)
(52) U.S. Cl. ............................................. 714/56; 714/4
(58) Field of Classification Search .................. None
See application file for complete search history.

(56) References Cited

U.S. PATENT DOCUMENTS

| | | | | |
|---|---|---|---|---|
| 5,633,999 A * | 5/1997 | Clowes et al. | ................... | 714/6 |
| 5,796,934 A * | 8/1998 | Bhanot et al. | ................... | 714/4 |
| 6,134,588 A * | 10/2000 | Guenthner et al. | .......... | 709/226 |
| 6,490,610 B1 * | 12/2002 | Rizvi et al. | .................. | 718/101 |
| 6,816,899 B1 * | 11/2004 | Meah | .......................... | 709/225 |
| 7,539,724 B1 * | 5/2009 | Callaghan | .................... | 709/205 |
| 7,711,956 B2 * | 5/2010 | Kinoshita et al. | ........... | 713/168 |
| 2003/0023893 A1 * | 1/2003 | Lee et al. | ........................ | 714/4 |
| 2003/0028817 A1 * | 2/2003 | Suzuyama et al. | ............. | 714/4 |
| 2004/0078622 A1 * | 4/2004 | Kaminsky et al. | .............. | 714/4 |
| 2005/0091217 A1 * | 4/2005 | Schlangen | .................... | 707/10 |
| 2007/0067453 A1 * | 3/2007 | Gale et al. | .................. | 709/224 |
| 2009/0144817 A1 * | 6/2009 | Kumar et al. | .................. | 726/12 |

* cited by examiner

*Primary Examiner*—Gabriel L Chu
(74) *Attorney, Agent, or Firm*—Jetter & Associates, P.A.

(57) ABSTRACT

A method and system for improving communications for systems (200) including at least one communications protocol (CP) enabled server device (206, . . . , 212). The method comprises performing a first diagnostic process (400). The first diagnostic process includes classifying at least one CP enabled server device as a malfunctioning device or an operational device. The method also includes preventing the CP enabled server device from participating in write or read transactions if it is classified as a malfunctioning device in the first diagnostic process. The CP enabled server device is prevented from participating in write or read transaction until the CP enabled server devices is reclassified in a subsequent repetition of the first diagnostic process as an operational device. The method further includes performing a write or read process with the CP enabled server device if it is classified as an operational device in the first diagnostic process.

10 Claims, 9 Drawing Sheets

SYSTEM AND METHOD FOR IMPROVING COMMUNICATIONS FOR SYSTEMS HAVING COMMUNICATIONS PROTOCOL ENABLED DEVICES

FIELD OF THE INVENTION

The invention concerns control systems and methods for reducing an impact of an unresponsive or malfunctioning communications protocol (e.g., MODBUS) enabled device on system communications.

BACKGROUND

Figure 1A:
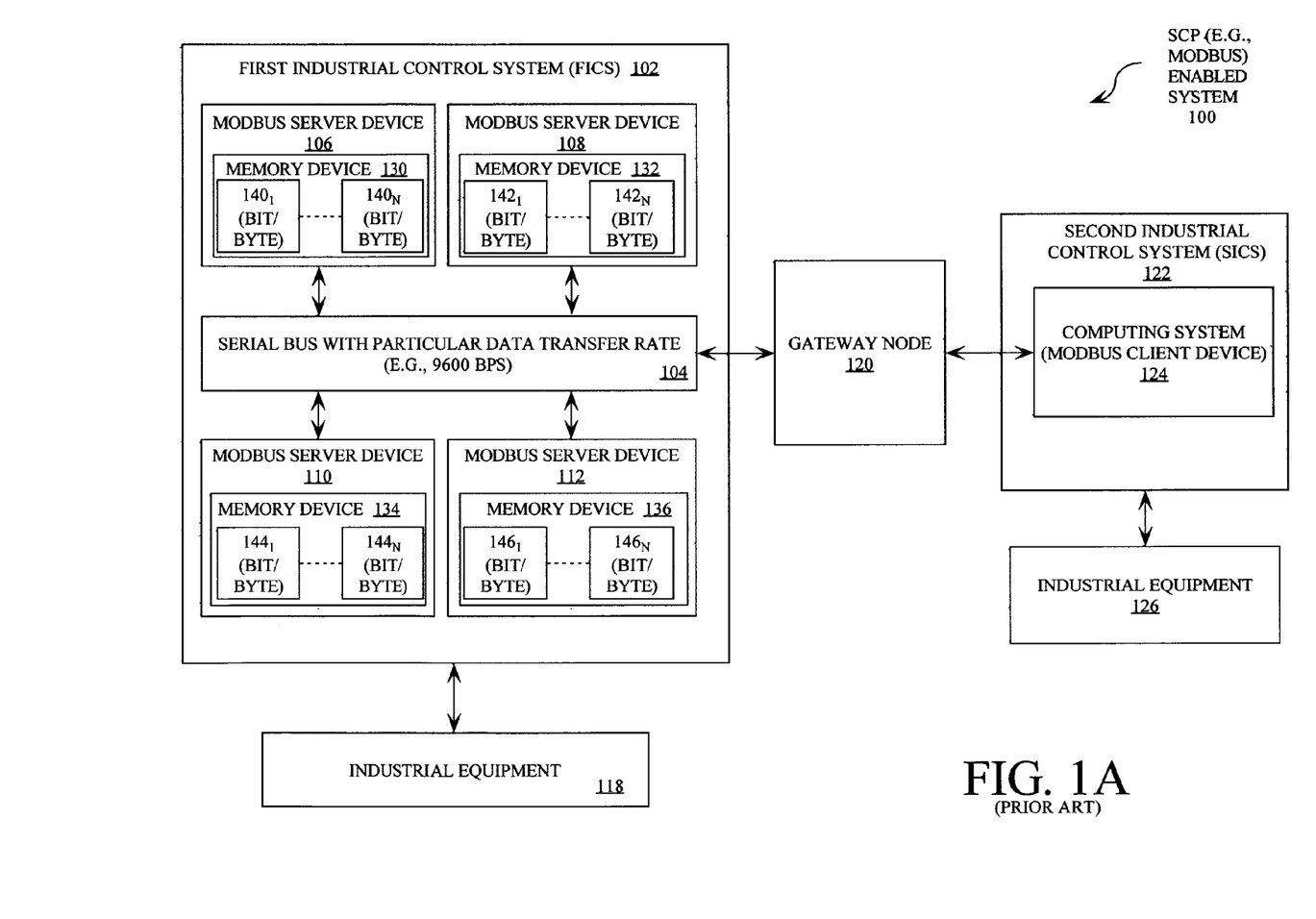
FIG. 1A is a block diagram of a conventional MODBUS enabled system.

There are many types of communications protocols known in the art. One such communications protocol (CP) is MODBUS. MODBUS is a serial communications protocol first published in 1979 for use with its programmable logic controllers (PLCs). It has become a de facto standard communications protocol in industry, and is now the most commonly available means of connecting industrial electronic devices. More particularly, the MODBUS protocol is often used for sending information between a client and server of a MODBUS enabled system. There are many types of CP (e.g., MODBUS) enabled systems known in the art, such as MODBUS and MODBUS TCP/IP enabled systems. An exemplary CP (e.g., MODBUS) enabled system 100 is shown in FIG. 1A. It should be noted that the term "TCP" as used herein refers to transmission control protocols. TCPs are well known to those having ordinary skill in the art, and therefore will not be described herein. The term "IP" as used herein refers to internet protocols. IPs are well known to those having ordinary skill in the art, and therefore will not be described herein.

System 100 is configured for controlling industrial equipment and processes. The system 100 is typically comprised of a first industrial control system (FICS) 102, a gateway node 120, a second industrial control system (SICS) 122, and industrial equipment 118, 126. The FICS and SICS 102, 122 can have a distributed network configuration, i.e., there are application specific modules connected to each other, industrial equipment 118, 126, and operator interfaces via a local control network. The gateway node 120 is configured to enable communications between the FICS and SICS 102, 122.

As shown in FIG. 1A, the FICS 102 generally includes a serial bus 104 and MODBUS server devices 106, 108, 110, 112 connected to and accessible by other portions of the system 100 through the serial bus 104. Each of the MODBUS server devices 106, 108, 110, 112 is comprised of a memory device 130, 132, 134, 136 including respective storage locations $140_1, \ldots, 140_N, 142_1, \ldots, 142_N, 144_1, \ldots, 144_N, 146_1, \ldots, 146_N$. Each of the memory devices 130, 132, 134, 136 has process parameter information stored therein. Such process parameter information generally includes, but is not limited to, information defining temperature parameters, timing parameters, and liquid level parameters.

SICS 122 is comprised of a computing system (or MODBUS client device) 124. The computing system 124 is typically a general purpose computer processing device. The computing system 124 is configured to allow users to monitor and/or control an industrial process or equipment 126. More particularly, the computing system 124 is configured to enable a user to write parameter information to and/or read parameter information from each of the MODBUS server devices 106, 108, 110, 112.

Figure 1B:
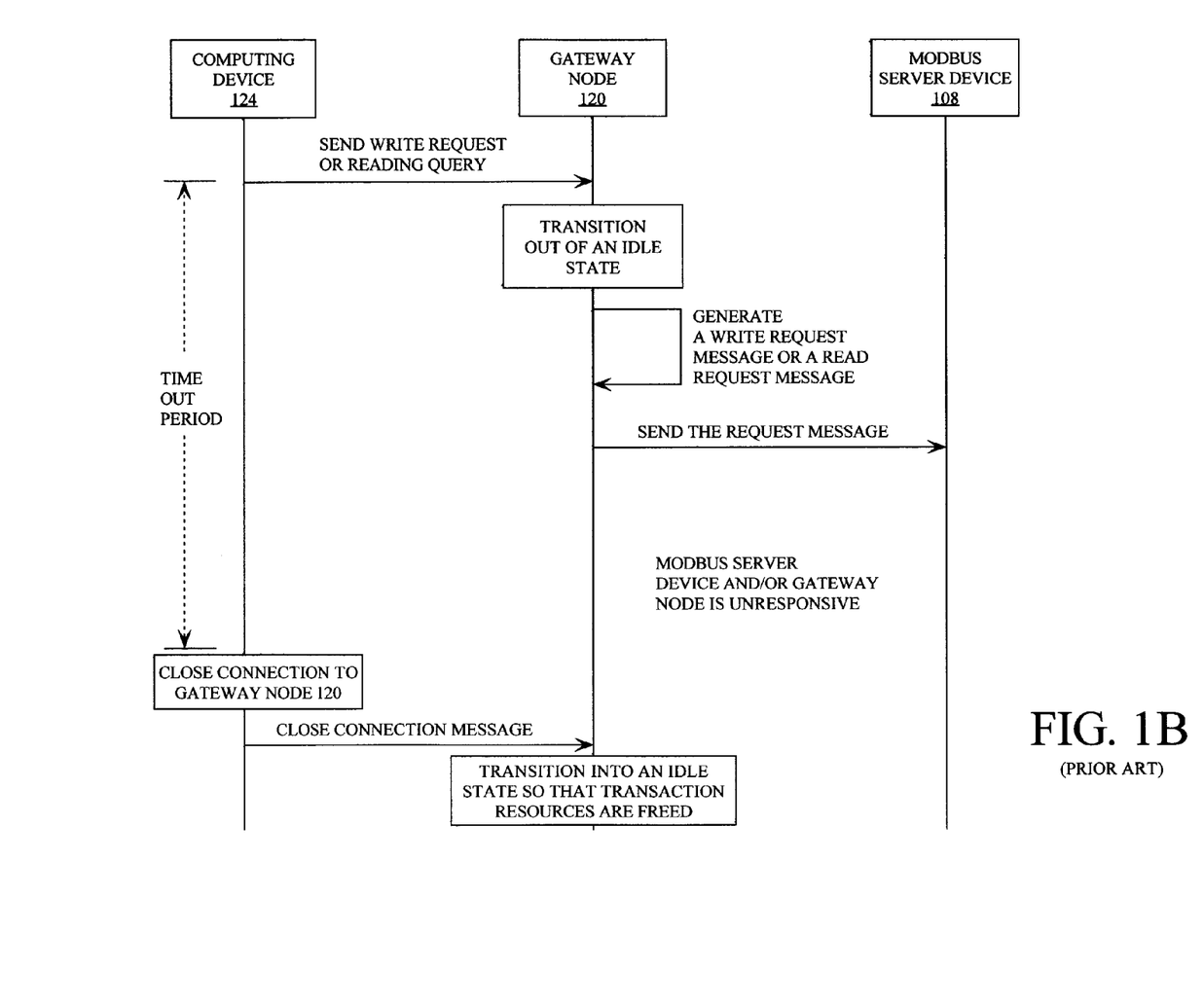
FIG. 1B is a sequence diagram of a conventional time out process performed by the computing system shown in FIG. 1A.
Figure 1C:
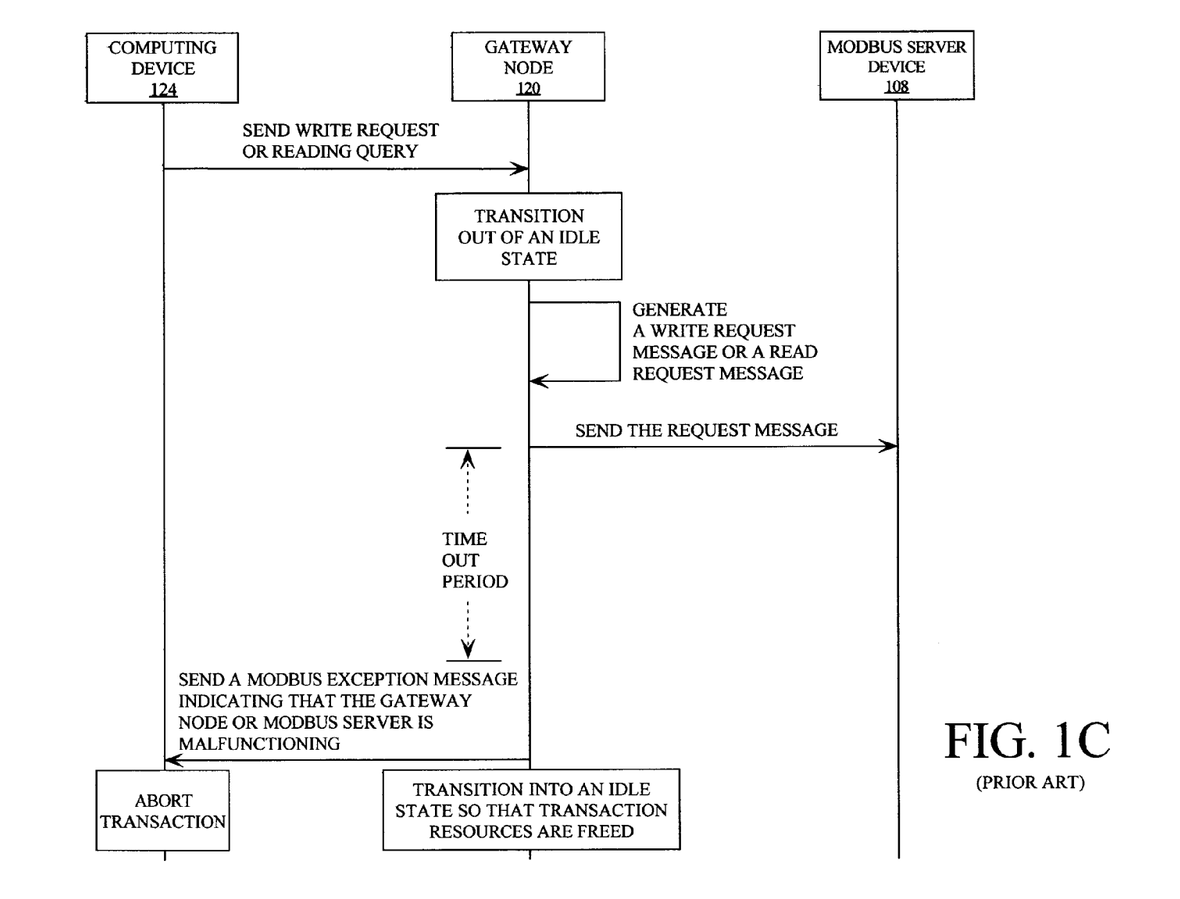
FIG. 1C is a sequence diagram of a conventional time out process performed by the gateway node shown in FIG. 1A.

As known in the art, reading or writing operations within system 100 are interrupted when the gateway node 120 or any MODBUS server device 106, . . . , 112 is found to be unresponsive or operating improperly (or malfunctioning). As should be understood, a MODBUS server device 106, . . . , 112 is unresponsive when it does not return a message in response to a write request or reading query. A MODBUS server device 106, . . . , 112 can operate improperly (or malfunction) when its internal hardware or software fails. The interruption occurs during a time out process. A typical time out process performed by the computing system 124 is shown in FIG. 1B. Similarly, a typical time out process performed by the gateway node 120 is shown in FIG. 1C. As shown in FIGS. 1B-1C, the interruption period is defined as a "time out period." The phrase "time out period" as used herein refers to a predetermined period of time that is fixed in the software to be long enough for a gateway node 120 or any MODBUS server device 106, . . . , 112 to respond normally, i.e., return a response message to the computing device 124 or the gateway node 120, respectively.

Despite certain advantages of system 100, it suffers from certain drawbacks. For example, write/read processes are restricted to a single write or read request at any given time. In addition, an unresponsive or malfunctioning MODBUS server device (e.g., server device 108) adversely affects the system communications with the other MODBUS server devices (e.g. devices 106, 110, 112). In this regard, no other write request or read query can be made to this MODBUS server device (e.g., device 108) or other MODBUS server devices (e.g. devices 106, 110, 112) during a time out process. Since no data is transferred during time out periods, the rate of data transfer in system 100 is reduced by time out periods. As such, there is a need for an improved CP enabled system capable of reducing the impact of an unresponsive or malfunctioning CP (e.g., MODBUS) enabled device on system communications.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods and implementing systems for improving communications for systems comprising at least one communications protocol (CP) enabled server device. The methods comprise the step of performing a first diagnostic process. The first diagnostic process comprises classifying the CP enabled server device as a malfunctioning device or an operational device. The methods also comprise the step of preventing the CP enabled server device from participating in write or read transactions if it is classified as a malfunctioning device. The CP enabled server device is prevented from participating in write or read transactions until the CP enabled server device is reclassified in a subsequent repetition of the first diagnostic process as an operational device. The methods further involve the steps of performing a write or read process with the CP enabled server device if it is classified as an operational device.

BRIEF DESCRIPTION OF THE DRAWINGS

Embodiments will be described with reference to the following drawing figures, in which like numerals represent like items throughout the figures, and in which.

DETAILED DESCRIPTION

The invention concerns methods (and related implementing systems) for reducing the impact of an unresponsive or malfunctioning communications protocol (e.g., CP) enabled device on system communications. Generally, such methods involve periodically performing a diagnostic process to determine if at least one CP (e.g., MODBUS or MODBUS TCP/IP) enabled device is responsive and operating properly. If a CP enabled device is determined to be unresponsive or operating improperly, then the CP enabled device can be disabled. Disabling the CP enabled device enables elimination of the previously required time out process described in the background which as noted above results in no data transfer (e.g. write/read communications) within the system during the full time out period. The diagnostic process can also be performed to determine if a gateway node (or TCP/IP interface) is responsive and operating properly. If the gateway node (or TCP/IP interface) is determined to be unresponsive or operating improperly, then a communications link to the gateway node (or TCP/IP interface) can be terminated and a communications link can be established between a CP client and another gateway node (or TCP/IP interface).

Write/read processes are not generally performed until the diagnostic process is complete and at least one CP enabled device is determined to be responsive and operating properly. The write/read processes are performed for writing data to or reading data from CP enabled devices determined to be operational and operating properly in the diagnostic process. As a result, the number of time out processes performed by a CP enabled system according to embodiments of the invention can be reduced, thus speeding up CP (e.g., MODBUS or MODBUS TCP/IP) enabled system communications.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the invention can be utilized. In this regard, it should be understood that the methods of the present invention can be utilized in any application where fast communications between communications protocol (e.g. MODBUS or MODBUS TCP/IP) enabled devices are required. Such applications include, but are not limited to, industrial plant control applications and customized network applications. Accordingly, the methods of the present invention will now be described in relation to one such application, namely, the industrial plant control application employing MODBUS communications protocol. The invention is not limited in this regard.

Figure 2:
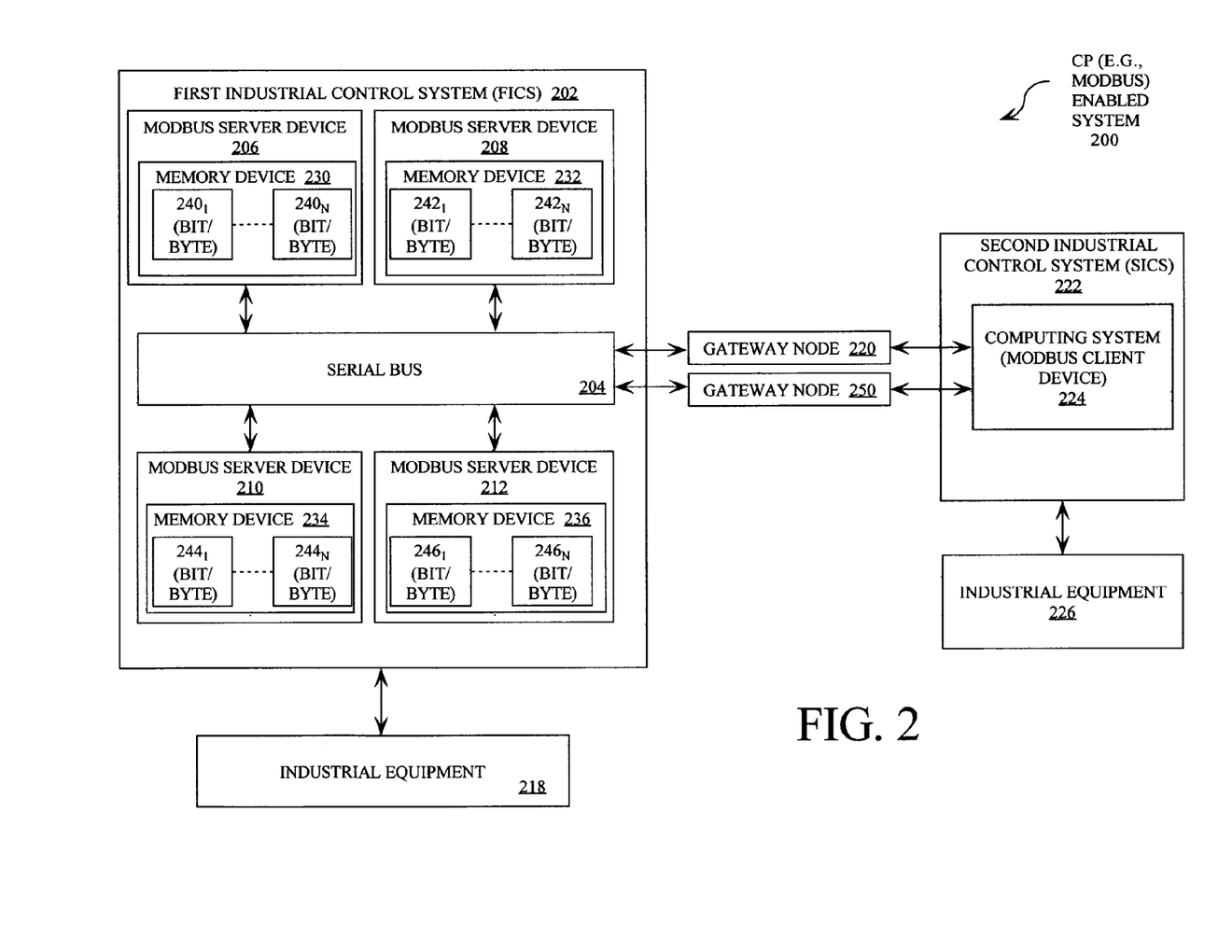
FIG. 2 is a block diagram of a communications protocol (e.g., MODBUS) enabled system according to an embodiment of the invention.

Referring now to FIG. 2, there is provided a block diagram of a communications protocol (e.g., MODBUS) enabled system 200 according to an embodiment of the present invention. However, it should be understood that the invention is not limited in this regard. For example, the system can be any communications protocol enabled system selected in accordance with generally any particular application, such as a MODBUS TCP/IP enabled system 650 shown in FIG. 6.

Figure 5:
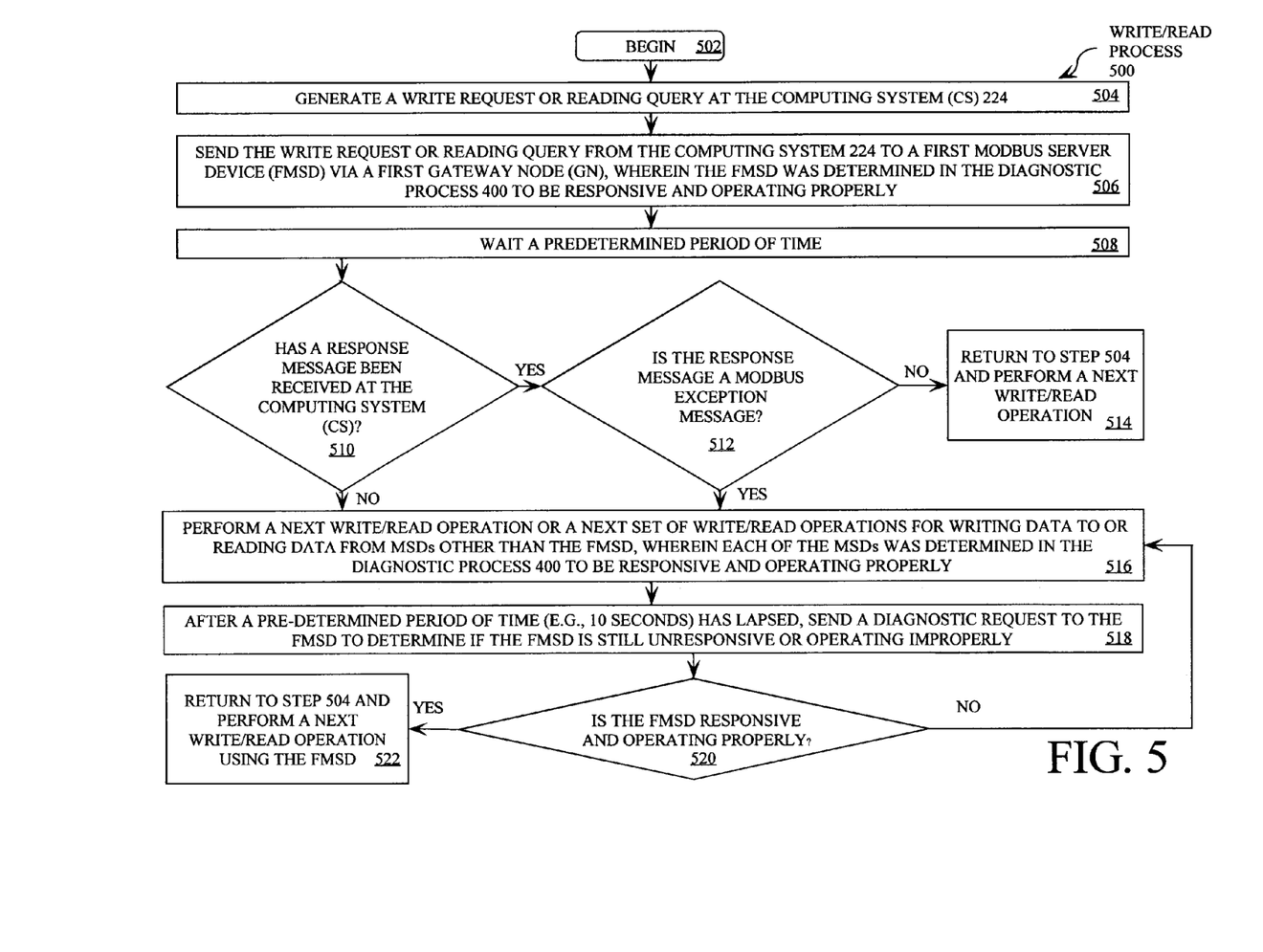
FIG. 5 is a flow diagram of a write/read process according to an embodiment of the invention performed by the MODBUS enabled system of FIG. 2.
Figure 6:
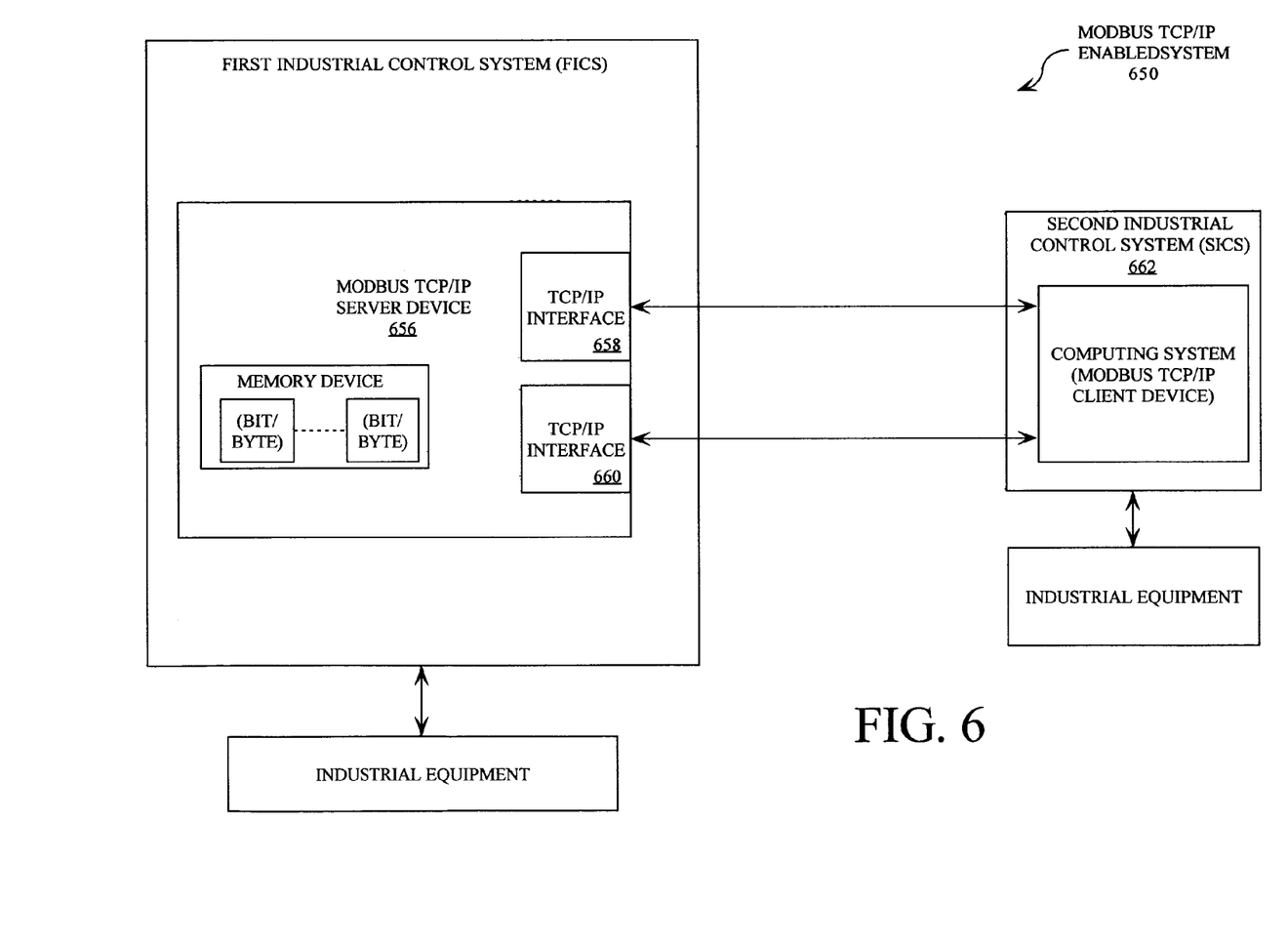
FIG. 6 is a block diagram of a communications protocol (e.g., MODBUS TCP/IP) enabled system according to an embodiment of the invention.

As shown in FIG. 6, the MODBUS TCP/IP enabled system 650 can generally comprise at least one MODBUS TCP/IP enabled server 656 having at least two (2) TCP/IP interfaces 658, 660. TCP/IP interfaces are well known to those having ordinary skill in the art, and therefore will not be described herein. However, it should be understood that the computer system (or MODBUS client device) can communicate directly with the MODBUS TCP/IP enabled server 656 via the TCP/IP interfaces 658, 660. In such as scenario, the MODBUS TCP/IP enabled system 650 can be configured to perform a diagnostic process similar to the diagnostic process described below in relation to FIGS. 4A-4B. The MODBUS TCP/IP enabled system 650 can be configured to perform a write/read process similar to the write/read process described below in relation to FIG. 5.

Referring again to FIG. 2, the MODBUS enabled system 200 is comprised of a first industrial control system (FICS) 202, gateway nodes 220, 250, a second industrial control system (SICS) 222, and industrial equipment 218, 226. Gateway nodes are well known to those having ordinary skill in the art, and therefore will not be described herein. However, it should be understood that the gateway nodes 220, 250 are configured to enable communications between the FICS 202 and SICS 222.

The FICS 202 is configured for enabling a user (not shown) to monitor and/or control the industrial equipment 218. Similarly, the SICS 222 is configured for enabling a user (not shown) to monitor and/or control the industrial equipment 226. In one non-limiting application, each of the systems 202, 222 can be distributed control systems, i.e., there are application specific modules (not shown) connected to each other, industrial equipment 218, 226 and operator interfaces (not shown) via a local control network (not shown). The industrial equipment 218, 226 may include, but is not limited to, gauges, valves, transmitters, actuators, and sensors. The invention is not limited in this regard.

As shown in FIG. 2, the FICS 202 is comprised of a serial bus 204 and MODBUS server devices 206, 208, 210, 212 connected to and accessible by other portions of the system 200 through the serial bus 204. Each of the MODBUS server devices 206, 208, 210, 212 is comprised of a memory device 230, 232, 234, 236. Each of the memory devices 230, 232, 234, 236 generally has process parameter information stored therein. Such process parameter information generally includes, but is not limited to, information defining temperature parameters, timing parameters, and liquid level parameters.

Each memory device 230, 232, 234, 236 is configured to store an entire data block comprising N data segments. Each of the N data segments can comprise any number of bits or words selected in accordance with a particular memory device application. For example, each data segment is comprised of one (1) bit of data or one (1) word of data. In this regard, it should be understood that each memory device 230, 232, 234, 236 can include a plurality of memory locations $240_1, \ldots, 240_N, 242_1, \ldots, 242_N, 244_1, \ldots, 244_N, 246_1, \ldots, 246_N$, respectively. If the memory devices 230, 232, 234, 236 are random access memory (RAM) devices, then each register (or memory location $240_1, \ldots, 240_N, 242_1, \ldots, 242_N, 244_1, \ldots, 244_N, 246_1, \ldots, 246_N$) is configured to store one (1) word of data. Alternatively, the memory devices 230, 232, 234, 236 can be comprised of coils configured to store one (1) bit of data. The invention is not limited in this regard.

Figure 3:
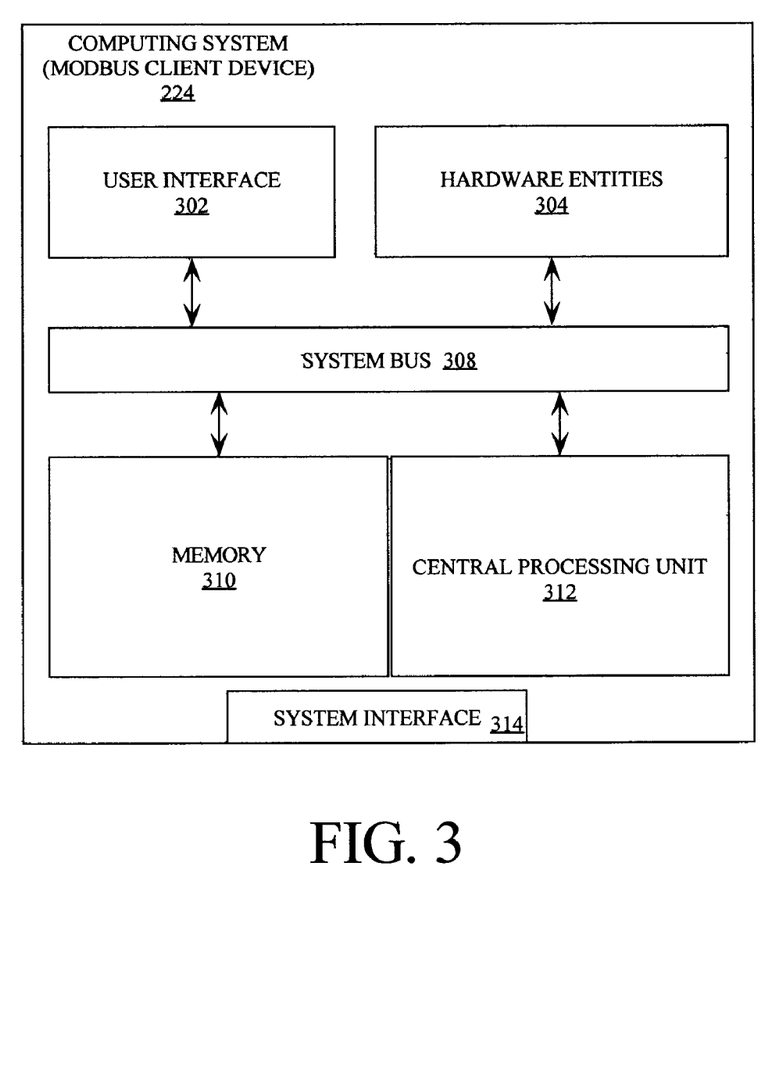
FIG. 3 is a more detailed block diagram of the computing system (or MODBUS) client device shown in FIG. 2.

As described above, SICS 222 is comprised of a computing system (or a MODBUS client device) 224. A more detailed block diagram of the computing system 224 is provided in FIG. 3. Referring now to FIG. 3, the computing system 224 may be a desktop personal computer system, a laptop personal computer system, a personal digital assistant, a mobile computing device, or any other general purpose computer processing device. Accordingly, the computing system 224 is comprised of a user interface 302 including input devices, output devices, and software routines configured to allow a user (not shown) to interact with and control software applications installed on the computing system 224. Such input and output devices include, but are not limited to, a display screen (not shown), a speaker (not shown), a keypad (not shown), a directional pad (not shown), a directional knob (not shown), and a microphone (not shown). As such, the computing system 224 can facilitate a user-software interaction for communicating with the FICS 202 (via a gateway node 220, 250) for reading data from or writing data to the MODBUS server devices 206, 208, 210, 212.

As shown in FIG. 3, the computing system 224 is also comprised of a system interface 314, a central processing unit (CPU) 312, a system bus 308, memory 310 connected to and accessible by other portions of the computing system 224 through the system bus 308, and hardware entities 304 connected to the system bus 308. At least some of the hardware entities 304 perform actions involving access to and use of the memory 310, which may be a random access memory (RAM), a disk driver, and/or a compact disc read only memory (CD-ROM). More particularly, the hardware entities 304 may include a microprocessor programmed for accessing the memory device 310, retrieving data stored in the memory device 310, and storing data in the memory device 310. The hardware entities 304 may also include additional microprocessors, application specific integrated circuits (ASICs), and other hardware.

The CPU 312 is configured to perform a diagnostic process for reducing an impact of an unresponsive or malfunctioning communications protocol (e.g., MODBUS) enabled device on system communications. The diagnostic process is generally performed for determining if at least one CP enabled device (e.g., MODBUS server device 206, ..., 212) is responsive and operating properly. The diagnostic process will be described in more detail below in relation to FIGS. 4A-4B.

The CPU 312 is also configured to perform a write/read process. The write/read process is generally performed after the completion of the diagnostic process (described below in relation to FIGS. 4A-4B). The write/read process is performed for writing data to or reading data from CP enabled devices (e.g., MODBUS server device 206, ..., 212). The CP enabled devices (e.g., MODBUS server device 206, ..., 212) include those devices determined to be responsive and operating properly in the previously performed diagnostic process. The write/read process will be described below in relation to FIG. 5.

Referring again to FIG. 3, the system interface 314 allows the computing system 224 to communicate directly with the gateway nodes 220, 250. However, the invention is not limited in this regard. For example, the system interface 314 can alternatively allow the computing system 224 to communicate indirectly with the gateway nodes 220, 250. In such a scenario, the computing system 224 communicates with the gateway nodes 220, 250 through a network (not shown). The network (not shown) can be a wired network, a wireless network, or a combination wired/wireless network, such as a local area network, a wide area network, or a personal area network.

Figure 4A:
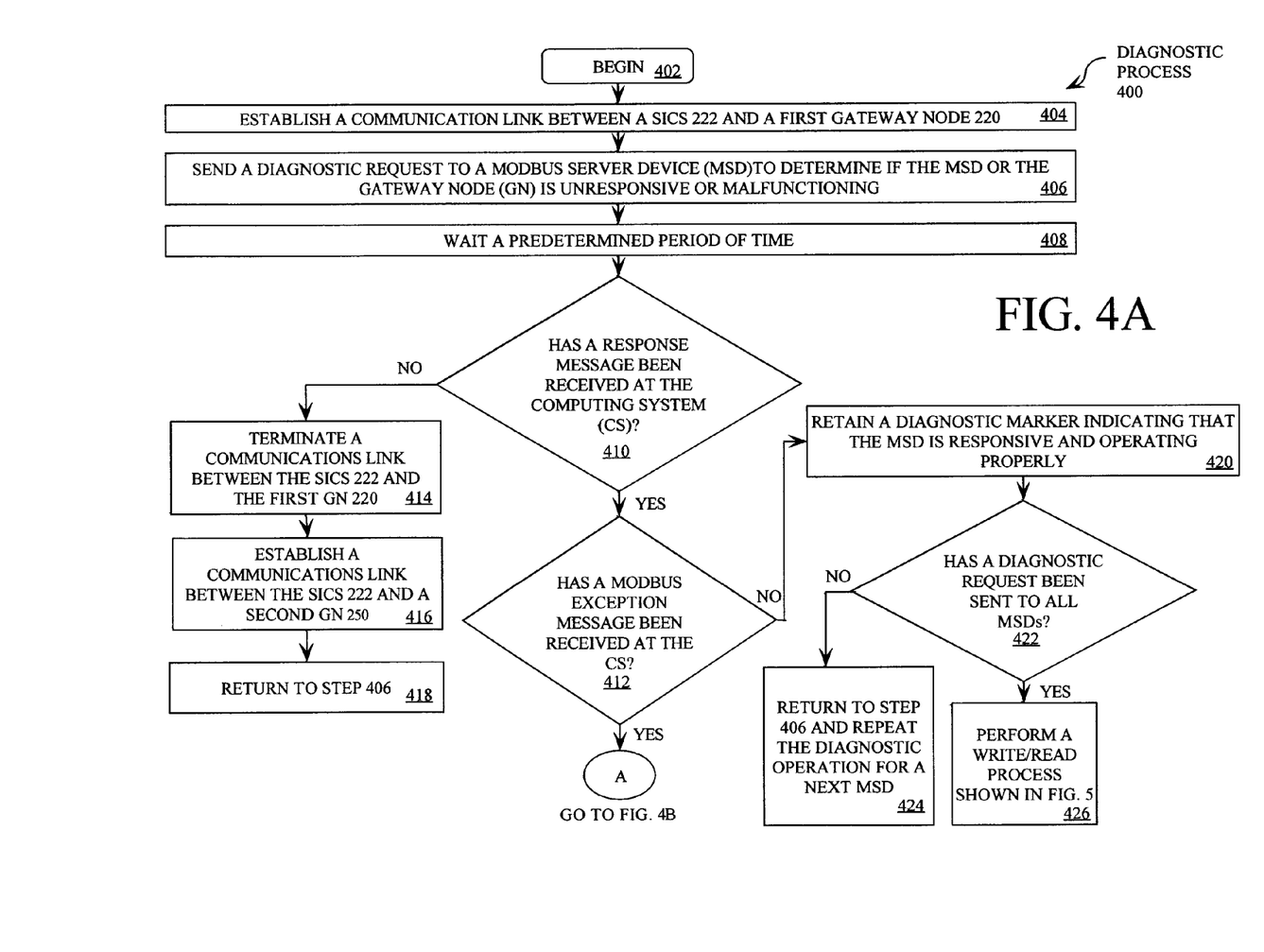
FIGS. 4A-4B collectively provide a flow diagram of a diagnostic process according to an embodiment of the invention performed by the computing system shown in FIGS. 2-3.
Figure 4B:
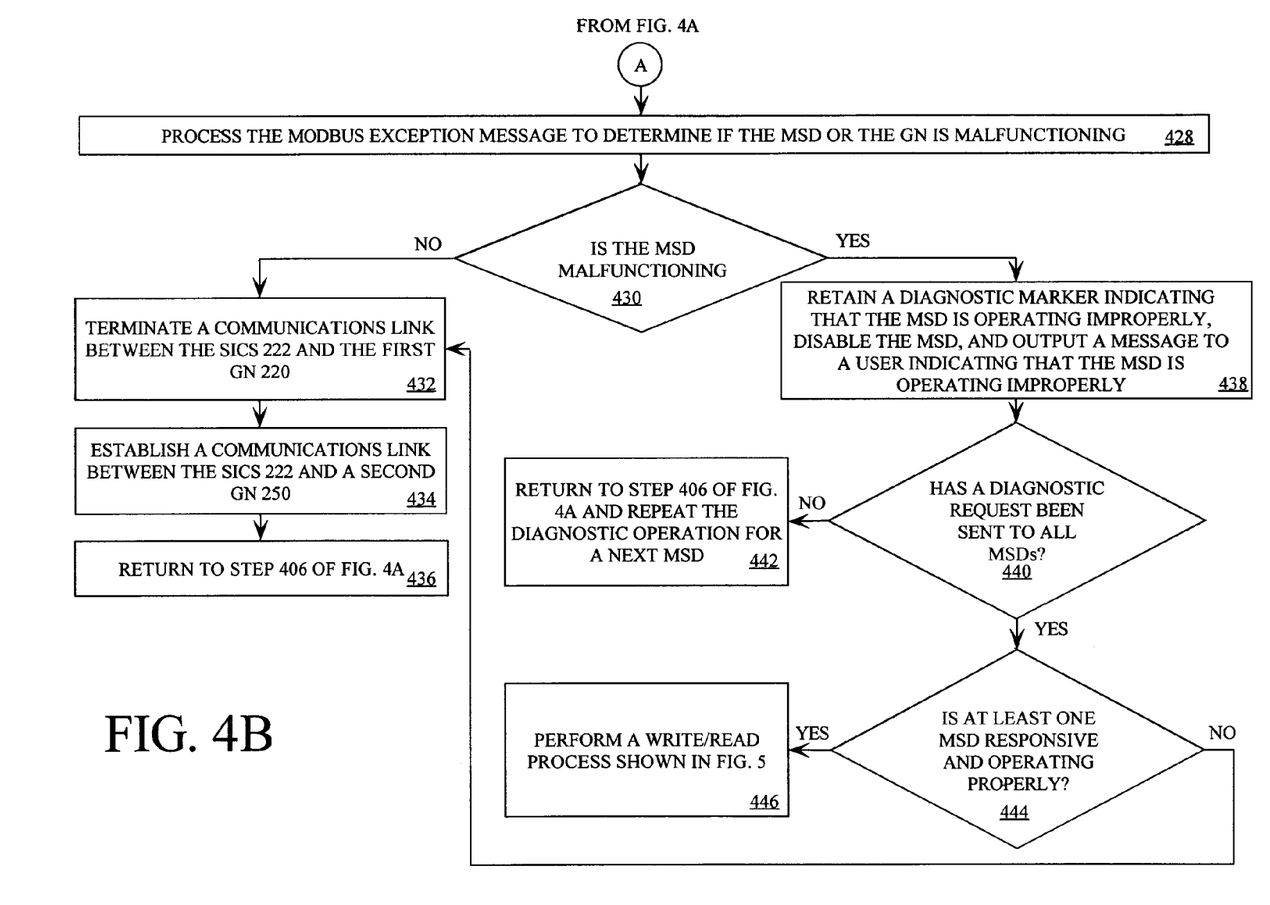

FIGS. 4A-4B and accompanying text illustrate a diagnostic process 400 according to an embodiment of the invention performed by system 200 shown in FIG. 2. It should be appreciated, however, that the diagnostic process disclosed herein is provided for purposes of illustration only and that the present invention is not limited solely to the diagnostic process shown. It should also be appreciated that the diagnostic process 400 can be periodically performed by the system 200 shown in FIG. 2. It should further be appreciated that the diagnostic process 400 reduces the adverse impact on data transfer speed due to unresponsive or malfunctioning communications protocol (e.g., MODBUS) enabled device on system communications by decreasing the number of time out processes performed by system 200. As should be understood, a CP enabled device is unresponsive when it does not return a message in response to a write request or reading query. A CP enabled device can operate improperly (or malfunction) when its internal hardware or software fails.

Referring now to FIGS. 4A-4B, the diagnostic process 400 begins at step 402 and continues with step 404. In step 404, a communications link is established between the SICS 222 and a first gateway node (e.g., gateway node 220 of FIG. 2). The SICS 222 is a system including a CP client device (e.g., computing system 224 of FIG. 2) that is configured for writing data to and reading data from a CP server device (e.g., MODBUS server 208 of FIG. 2). After establishing the communications link with the first gateway node, step 406 is performed. In step 406, a diagnostic request is sent from the CP client device (e.g., computing system 224) to the first gateway node for obtaining information from a CP server device (e.g., MODBUS server 208). The phrase "diagnostic request" as used herein refers to a configured read or write operation forming a query for information that can be used for determining if a CP server device (e.g., MODBUS server 208) or a gateway node (e.g., gateway node 220) is unresponsive or operating improperly. Such information can include, but is not limited to, discrete input values, specific word data, device parameters, and device specific diagnostic register (word) values.

Subsequent to the completion of step 406, the diagnostic process 400 continues with step 408. In step 408, the CP client device (e.g., computing system 224) waits a predetermined period of time. This predetermined period of time can be set to be long enough for a gateway node (e.g., gateway node 220) or any CP server device (e.g., MODBUS server 208) to respond to a diagnostic request. For example, the predetermined period of time in one exemplary embodiment is set to fifty milliseconds, which is generally long enough for (a) a CP server device (e.g., MODBUS server 208) to return a response message to the gateway node and (b) the gateway node to forward the response message to a CP client device. The phrase "response message" refers to a message generated in response to receiving a message including a diagnostic request. Embodiments of the invention are not limited in this regard.

The diagnostic process 400 continues with a decision step 410. If a response message is not received at the CP client (e.g., computing system 224) [410:NO], then it is assumed that at least one of the gateway node and CP server device is unresponsive. In such a scenario, the diagnostic process 400 continues with step 414. In step 414, the communications link between the SICS 222 and the first gateway node 220 is terminated. In the next step 416, a communication link is established between the SICS 222 and a second gateway node (e.g., gateway node 250). After step 416, step 418 is performed where the diagnostic process 400 returns to step 406.

If a response message is received at the CP client device (e.g., computing system 224) [410:YES], then the diagnostic process 400 continues with a decision step 412. If a CP exception message has not been received at the CP client (e.g., computing system 224) [412:NO], then step 420 is performed. It should be noted that a CP exception message is a response message indicating that a gateway node (e.g. gateway nodes 220, 250) is operating improperly and/or a CP server device (e.g., MODBUS server devices 206, . . . , 212) is operating improperly. Such CP exception messages include MODBUS exception messages, which are well known to those having ordinary skill in the art.

Step 420 involves retaining a diagnostic marker at the CP client device (e.g., computing system 224). The diagnostic marker can include information indicating that the CP server device (e.g., MODBUS server 208) is responsive and operating properly. The diagnostic marker can be stored in the memory device 310 (described above in relation to FIG. 3) of a computing system 224 for subsequent use in a write/read process (described below in relation to FIG. 5).

After completing step 420, the diagnostic process 400 continues with a decision step 422. If a diagnostic request has been sent to all CP server devices [422:YES], then the diagnostic process 400 continues with step 426 where a write/read process is performed. The write/read process will be described below in relation to FIG. 5. Alternatively, if a diagnostic request has not been sent to all CP server devices [422:NO], then the diagnostic process 400 returns to step 406 so that the diagnostic operation will be repeated to determine if a next CP server device (e.g., MODBUS server devices 206, 208, 210, 212) is unresponsive or operating improperly.

If a MODBUS exception message has been received at the CP client device (e.g., computing system 224) [412:YES], then the diagnostic process 400 continues with a step 428 of FIG. 4B. In step 428, the CP exception message is processed to determine if the CP server device (e.g., MODBUS server 208) or the first gateway node (e.g., gateway node 220) is operating improperly. If the CP server device is operating properly, then the CP exception message indicates that the first gateway node is operating improperly. In such a scenario [430: NO], the diagnostic process 400 continues with step 432. In step 432, the communications link between the SICS 222 and the first gateway node is terminated. Thereafter, step 434 is performed where a communications link is established between the SICS 222 and a second gateway node (e.g., gateway node 250). After establishing the communication link, step 436 is performed where the diagnostic process 400 returns to step 406 of FIG. 4A.

Alternatively, if the CP server device is operating improperly [430:YES], then the diagnostic process 400 continues with step 438. In step 438, a diagnostic marker is retained at the CP client device (e.g., computing system 224). The diagnostic marker can include information indicating that the CP server device is operating improperly. The diagnostic marker can be stored in the memory device 310 (described above in relation to FIG. 3) of the computing system 224 for subsequent use in a write/read process (described below in relation to FIG. 5).

Step 438 can also involve disabling the CP server device to ensure that reading queries and write requests will not be communicated to the CP server device during a subsequent write/read process. As noted above, the write/read process will be described below in relation to FIG. 5. Step 438 can further involve outputting a message to a user (not shown) of the CP client device (e.g., computing system 224). The message can indicate that the particular CP server device (e.g., MODBUS server 208) is operating improperly.

Subsequent to the completion of step 438, the diagnostic process 400 continues with a decision step 440. If a diagnostic request has not been sent to all CP server devices [440:NO], then step 442 is performed. In step 442, the diagnostic process 400 returns to step 406 of FIG. 4A. Step 442 is performed so that the diagnostic operation will be repeated to determine if a next CP server device (e.g., MODBUS server devices 212) is unresponsive and operating improperly. Alternatively, if a diagnostic request has been sent to all CP server devices [440:YES], then the diagnostic process 400 continues with a decision step 444. If at least one CP server device is operating properly [444:YES], then a write/read process is performed. The write/read process will be described below in relation to FIG. 5. If at least one CP server device is not operating properly [444:NO], then the diagnostic process 400 continues with step 432.

It should be appreciated that the above described diagnostic process 400 according to an embodiment of the invention reduces the adverse impact of an unresponsive or malfunctioning CP server device on system write/read communications. This impact reduction is achieved by (a) determining if at least one CP enabled device is responsive and operating properly, and (b) disabling CP server devices determined to be unresponsive or operating improperly. This device disablement results in an elimination of time out processes resulting from subsequent write request messages and reading query messages communicated to unresponsive or malfunctioning CP server devices.

It should also be appreciated that write/read processes are generally not performed until the diagnostic process is complete and at least one CP server device is determined to be responsive and operating properly. The write/read processes are performed for writing data to or reading data from at least one CP server device determined to be operational and operating properly. As a result, the number of time out processes performed by a CP enabled system (such as system 200) can be reduced. More particularly, the number of time out process performed by a CP client device or gateway node is reduced. An exemplary write/read process will now be described in relation to FIG. 5.

As shown in FIG. 5, an exemplary write/read process 500 begins at step 502 and continues with step 504. In step 504, a write request or a reading query is generated at a CP client device (e.g., computing system 224). Write requests and reading queries are well known to those having ordinary skill in the art, and therefore will not be described herein. Upon generating the write request or reading query, step 506 is performed. In step 506, the write request or reading query is sent from the CP client device to a first CP server device (e.g., MODBUS server devices 208). The first CP server device is a device determined to be responsive and operating properly during a previous diagnosis process (described above in relation to FIGS. 4A-4B).

If a gateway node (e.g., gateway node 220) is required for enabling communications between the CP client device and the first CP server device, then step 506 involves communicating the write request or reading query from the CP client device to the gateway node. The gateway node then generates a message including the write request or reading query and communicates the generated message to the first CP server device.

In step 508, the CP client device waits a predetermined period of time. This predetermined period of time can be set to be long enough for a gateway node (e.g., gateway node 220) or any CP server device (e.g., MODBUS server 208) to respond to a write request or reading query. For example, in one exemplary embodiment, the predetermined period of time is set to fifty milliseconds, which is long enough for (a) the MODBUS server 208 to return a response message to the gateway node 220 and (b) the gateway node 220 to forward the response message to the computing system 224. The phrase "response message" refers to a message generated in response to receiving a message including a write request or reading query. Still, the invention is not limited in this regard.

Once the predetermined period of time has lapsed, a decision step 510 is performed. If a response message has been received at the CP client device [5 10:YES], then a decision step 512 is performed. If the response message is not a MODBUS exception message indicating that the CP server device is malfunctioning [512:NO], then step 514 is performed where the write/read process 500 returns to step 504. If the response message is a MODBUS exception message indicating that the CP server device is malfunctioning [512:YES], then the write/read process 500 continues with step 516, which will be described below.

Alternatively, if a response message has not been received at the CP client device [510:NO], then step 516 is performed. In step 516, a next write/read operation (or a next set of write/read operations) is performed for writing data to or reading data from a CP server device (or CP server devices) other than the first CP enabled device. The CP enabled device(s) is (or are) a device (or devices) that was (or were) determined to be responsive and operating properly during a previous diagnostic process 400 (described above in relation to FIG. 4).

In step 518, a diagnostic process is performed to determine if the first CP server device is still unresponsive or operating improperly. This diagnostic process involves sending at least one diagnostic request to the first CP server device. It should be understood that diagnostic process is performed at a reduced configurable rate relative to write/read operations. Stated differently, a diagnostic request is sent to the first CP server device after the expiration of a predetermined period of time. This predetermined period of time can be set to be long enough for one or more write/read operations to be fully performed. For example, the predetermined period of time can be selected as a value falling within the range of about fifty (50) milliseconds to sixty (60) seconds. The invention is not limited in this regard. As a result of waiting the predetermined period of time, the diagnostic communications can be selectively controlled so as to reduce the impact of a time out process on write/read communications throughput. As described above, a time out process can result from sending communications to an unresponsive or malfunctioning CP enabled device.

After the diagnostic request has been communicated to the first CP enabled device, a decision step 520 is performed where a determination is made as to whether the first CP enabled device is responsive and operating properly. If the first CP enabled device is determined to be unresponsive or operating improperly [520:NO], then the write/read process 500 returns to step 516. Alternatively, if the first CP enabled device is determined to be responsive or operating properly [520:YES], then step 522 is performed where the write/read process 500 returns to step 504.

It should be noted that the diagnostic process 400 described above in relation to FIGS. 4A-4B can be amended in accordance with a MODBUS TCP/IP application. For example, step 404 of FIG. 4A can alternatively involve establishing a communications link between an SICS of a MODBUS TCP/IP enabled system (e.g., system 650 of FIG. 6) and a first TCP/IP interface of a MODBUS server device (e.g., MODBUS server device 656 of FIG. 6). As a result, step 406 of FIG. 4A can alternatively involve sending a diagnostic request to the MODBUS server device (MSD) to determine if the MSD or the first TCP/IP interface is operating properly. Step 414 of FIG. 4A can alternatively involve terminating a communications link between the SICS 662 of a MODBUS TCP/IP enabled system (e.g., system 650 of FIG. 6) and the first TCP/IP interface of a MODBUS server device (e.g., MODBUS server device 656 of FIG. 6). Thereafter, a communications link between the SICS of a MODBUS TCP/IP enabled system (e.g., system 650 of FIG. 6) and a second TCP/IP interface of a MODBUS server device (e.g., MODBUS server device 656 of FIG. 6) can be established. Furthermore, step 420 of FIG. 4A can be directly connected to step 426 of FIG. 4A in scenarios where the MODBUS TCP/IP enabled system (e.g., system 650 of FIG. 6) comprises a single MODBUS server device (e.g., MODBUS server device 656 of FIG. 6). Likewise, steps 428, 432, and 434 of FIG. 4B can be amended by replacing the phrase "gateway node" with the phrase "TCP/IP interface". Step 438 of FIG. 4B can be directly connected to step 446 of FIG. 4B scenarios where the MODBUS TCP/IP enabled system (e.g., system 650 of FIG. 6) comprises a single MODBUS server device (e.g., MODBUS server device 656 of FIG. 6). The invention is not limited in this regard.

It should also be noted that the write/read process 500 described above in relation to FIG. 5 can be amended in accordance with a MODBUS TCP/IP application. For example, step 506 of FIG. 5 can be amended to involve directly sending a write request or reading query from an SICS 662 of a MODBUS TCP/IP enabled system (e.g., system 650 of FIG. 6) to a MODBUS server device (e.g., MODBUS server device 656 of FIG. 6) using a first TCP/IP interface of the server device. Step 516 can be removed in scenarios where the MODBUS TCP/IP enabled system (e.g., system 650 of FIG. 6) comprises a single MODBUS server device (e.g., MODBUS server device 656 of FIG. 6). The invention is not limited in this regard.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for improving communications for systems comprising a plurality of communications protocol (CP) enabled server devices connectable by either a first gateway node or a second gateway node to a CP client device, comprising the steps of:
    performing a first diagnostic process with said CP client device connected by said first gateway node to a first of said plurality of CP enabled server devices, said first diagnostic process comprising said CP client device sending a first diagnostic request using said first gateway node
    wherein if a first response message is received responsive to said first diagnostic request,
    (i) if said first diagnostic message indicates proper first CP server operation, determining said first CP enabled server to be an operational device and establishing said first CP server and said first gateway node for communications to said CP client device, and
    (ii) if said first response message is an exception message that indicates said first CP enabled server device is unresponsive, performing a second diagnostic process with said CP client device connected by said first gateway node to respective others of said plurality of said CP enabled server devices besides said first CP enabled server device, and if a second response message is received responsive to said second diagnostic indicating proper operation of at least one of said respective others of said plurality of CP enabled server devices determining said one of said respective other of said plurality of CP enabled server devices said operational device and establishing said one of said respective other of said plurality of CP enabled server devices and said first gateway node for communications to said CP client device, and
    wherein if no first response message is received by said CP client device, and none of said respective others of said plurality of CP enabled server devices are determined to be said operational device, establishing said first CP server and said second gateway node for communications to said CP client device.

2. The method according to claim 1, wherein if said exception message indicates said first CP enabled server device is unresponsive, preventing said first CP enabled server device from participating in write or read transactions with said CP client device unless said first CP enabled server device is later reclassified in a subsequent repetition of said method as said operational device.

3. The method according to claim 2, wherein said method is repeated and said first and said second diagnostic process are performed at a reduced configurable rate relative to said write or read process transactions.

4. The method according to claim 2, wherein said preventing further comprises disabling said first CP enabled server device.

5. The method according to claim 1, wherein said plurality of CP enabled server devices are either MODBUS enabled devices or MODBUS TCP/IP enabled devices.

6. The method according to claim 1, wherein said plurality of CP enabled server devices are part of a first industrial control system that controls first industrial equipment and said CP client device is part of a second industrial control system that controls second industrial equipment.

7. The method according to claim 1, wherein said first diagnostic process further comprises retaining a diagnostic marker at said CP client device indicating that said first CP enabled server device is responsive and operating properly if said first response message indicates that said first CP enabled server device is said operational device and said first CP enabled server device is operating improperly if said first CP enabled server device is determined to be unresponsive.

8. A control system, comprising:
    a first industrial control system including first industrial equipment and a plurality of CP enabled server devices, said first industrial control system for controlling said first industrial equipment; and
    a second industrial control system including second industrial equipment and a CP enabled client device, said second industrial control system for controlling said second industrial equipment;
    a first gateway node and a second gateway node both available for connecting any of said plurality of CP enabled server devices to said CP client device;
    said CP enabled client device configured for performing a first diagnostic process, said first diagnostic process with said CP client device connected by said first gateway node to a first of said plurality of CP enabled server devices, said first diagnostic process comprising said CP client device sending a first diagnostic request using said first gateway node
    wherein if a first response message is received responsive to said first diagnostic request,
    (i) if said first diagnostic message indicates proper first CP server operation, determining said first CP enabled server to be an operational device and establishing said first CP server and said first gateway node for communications to said CP client device, and
    (ii) if said first response message is an exception message that indicates said first CP enabled server device is unresponsive, performing a second diagnostic process with said CP client device connected by said first gateway node to respective others of said plurality of said CP enabled server devices besides said first CP enabled server device, and if a second response message is received responsive to said second diagnostic indicating proper operation of at least one of said respective others of said plurality of CP enabled server devices determining said one of said respective other of said plurality of CP enabled server devices said operational device and establishing said one of said respective other of said plurality of CP enabled server devices and said first gateway node for communications to said CP client device, and wherein if no first response message is received by said CP client device, and none of said respective others of said plurality of CP enabled server devices are determined to be said operational device, establishing said first CP server and said second gateway node for communications to said CP client device.

9. The system according to claim 8, wherein if said exception message indicates said first CP enabled server device is unresponsive, said control system preventing said first CP enabled server device from participating in write or read transactions unless said first CP enabled server device is later reclassified in a subsequent repetition of said method as an operational device.

10. The system according to claim 8, wherein said CP enabled client device is either a MODBUS enabled client device or a MODBUS TCP/IP enabled client device and said plurality of CP enabled server devices are either MODBUS enabled server devices or MODBUS TCP/IP enabled server devices.

* * * * *